United States Patent [19]

Wilson

[11] 4,368,119
[45] Jan. 11, 1983

[54] APPARATUS FOR CONTINUOUS TREATMENT OF MIXTURES

[75] Inventor: Gerald E. Wilson, London, Canada

[73] Assignee: Carpools Environmental Protection Services Limited, London, Canada

[21] Appl. No.: 235,825

[22] Filed: Feb. 19, 1981

[51] Int. Cl.³ ............................................. B01D 29/36
[52] U.S. Cl. ................................... 210/137; 210/315; 210/339; 210/433.1; 210/456
[58] Field of Search ...................... 210/316, 317, 323.2, 210/342, 433.1, 315, 137, 456, 335, 339, 313, 307, 306, 305, 304, 433.2

[56] References Cited

U.S. PATENT DOCUMENTS

| | | | |
|---|---|---|---|
| 1,430,950 | 10/1922 | Crandall | 210/335 |
| 3,049,240 | 8/1962 | Smith | 210/295 |
| 3,120,490 | 2/1964 | Samson | 210/433.1 X |
| 3,487,932 | 2/1967 | Forrester et al. | 210/130 |
| 3,616,929 | 11/1971 | Manjikian | 210/321 |
| 3,622,004 | 11/1971 | Meyer | 210/134 |
| 3,689,226 | 9/1972 | Stoddard | 23/280 |
| 3,782,556 | 1/1974 | Murkes | 210/433.1 X |
| 3,794,179 | 2/1974 | Doucet | 210/433.1 X |
| 3,856,683 | 12/1974 | Parr | 210/336 |
| 3,957,634 | 5/1976 | Orensten et al. | 210/130 |
| 3,993,561 | 11/1976 | Swearingen | 210/131 |
| 4,003,836 | 1/1977 | Stearns et al. | 210/247 |

FOREIGN PATENT DOCUMENTS 761791 3/1971 Belgium ............................... 210/33

*Primary Examiner*—Frank A. Spear, Jr.
*Attorney, Agent, or Firm*—Beveridge, DeGrandi & Kline

[57] ABSTRACT

The invention relates to an apparatus for treatment of particulate mixtures such as a mixture of solid particles, which is to be depleted in, enriched by or treated with a fluid, or wherein the mixture acts as a treatment medium for a fluid passing through same. The apparatus is of the type operating with an advancing bed of the particulate material. It utilizes walls permeable by at least a portion of the fluid. The apparatus is of the type of tubular, rectangular or the like vessel having only stationary parts and subdivided by a selected combination of permeable and non-permeable walls into separate chambers into or from which the fluid can be delivered or removed. The movement of the particulate mixture is effected solely by forcing same through a passage having preferably but not exclusively an annular chamber, by pumping, by gravity or by a combination of both. Additional throttling or valve means are employed to selectively control the advancement of the bed through the device. The device is simple in structure and can be relatively easily adjusted for a great variety of different operations, from plain filtering to a complex washing or treatment of the particulate bed with different liquids in order to extract desired matter from the raw bed.

12 Claims, 13 Drawing Figures

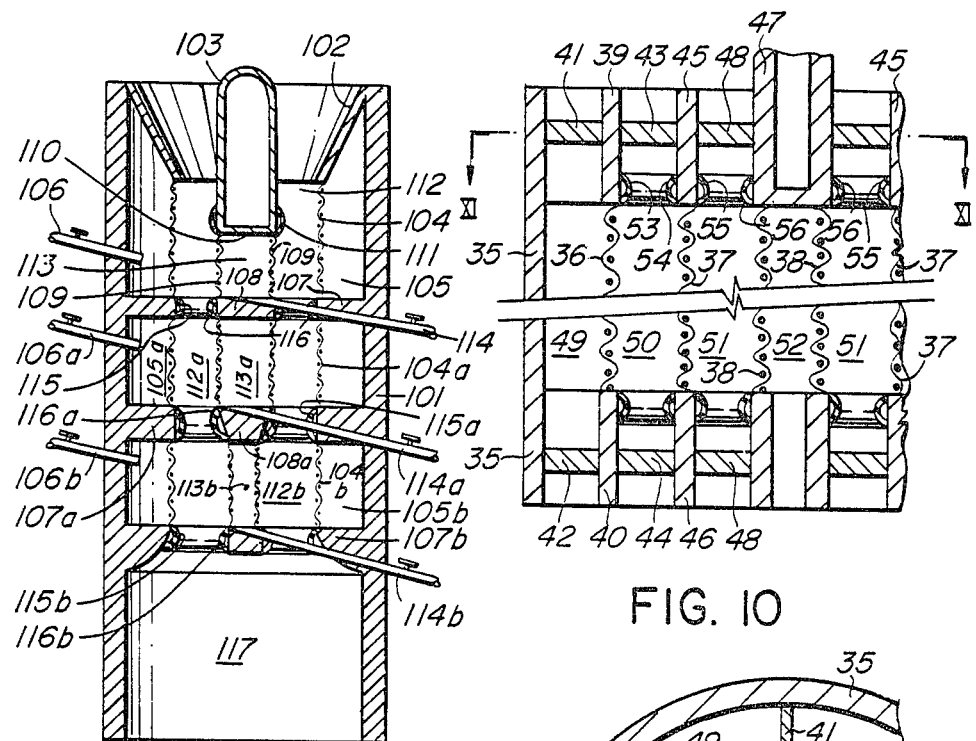
FIG. 8
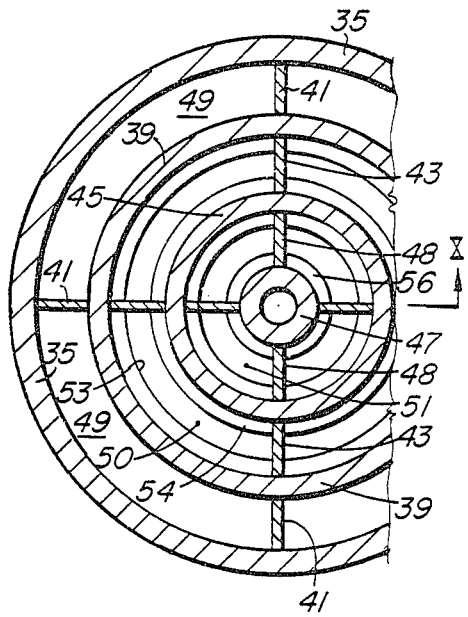
FIG. 10
FIG. 11
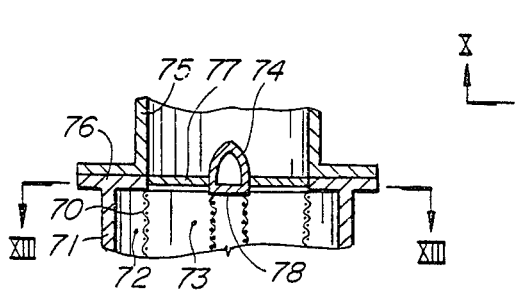
FIG. 12
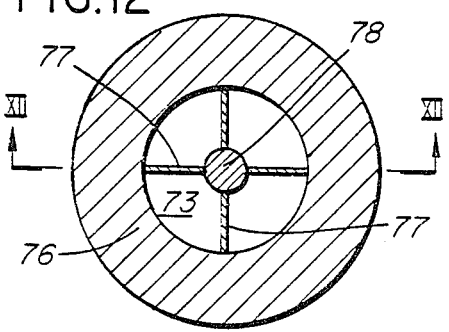
FIG. 13

APPARATUS FOR CONTINUOUS TREATMENT OF MIXTURES

The present invention relates to an apparatus for continuous treatment of a mixture comprising a fluid component and a solid, particulate component, wherein said mixture is subjected to a filtering effect.

The above broad definition of the apparatus encompasses a great variety of different applications of the device. For instance, the apparatus of the present invention can be used in lautering of brewer's grains wherein it is desirable to effect filtration effect through a bed containing natural ingredients such as brewer's grains with or without additional filtering material in the traditional lautering operation, for the separation and clarification of brewers wort from the spent grain material. Another application of the present invention may be in the field of tar sands extraction. In such embodiment, the bed may contain sand and other filtering material from the initial fluid mass or tar sands, water, steam and other gases, liquids and solids utilized in the extraction, separation or solvent processes with or without chemical and electromagnetic action. A yet further example of application of the present invention is in the demineralization or ion exchange process in which the bed will typically contain specific resins or other materials effective in attracting or repelling ions in numerous processes of ion exchange of which water softening is but one example. The treatment or processing of food industry by-products, sewage treatment, water and liquid purification, reverse osmotic systems and air and gas purification and solids separation are further examples in which the present invention may be useful.

It follows from the above exemplary list of applications that the apparatus of the present invention can be used for the filtering in the ordinary sense of the word, i.e. in separating the fluid and solid components of a mixture from each other, or the filtering action may be mainly effected by the bed formed from the solid/fluid mixture. The invention is particularly advantageous in the second group of applications.

In the known devices of this type, a bed of treated or treating material is usually formed on a permeable base such as a wire mesh and then subjected to treatment by a fluid, usually a liquid or gas. The movement of the filtering bed formed by the mixture is usually effected by moving of the base which requires relatively complex mechanical arrangements. Another known arrangement of this type is basically of the type of a filtering press which can only operate in batches, not in a continuous fashion. One of the important aspects of the operation of known stationary filtering devices is that the rate of passage of the mixture to be processed or treated can be controlled only to a very limited degree. In known practice, the problem is solved by arranging individual filters in series to achieve the desired result, be it the enrichment of the particulate bed with the fluid or extraction of certain fractions from the bed by passage therethrough of a suitable field. It is also known from Belgian Pat. No. 761,791 issued Mar. 31, 1971 to E. J. Petitjean to provide an apparatus for continuous liquid treatment with mobile bed wherein the treatment bed moves downwardly under gravity between two stationary porous walls. One of the disadvantages of the apparatus is that it requires a gravity feed and has a limited pressure capability at the infeed beyond which the moving bed would rupture and prevent proper functioning.

It is an object of the present invention to provide an improved device of the above type, which would be of a relatively compact structural configuration, relatively inexpensive to produce and would offer a more refined control of the treatment mainly by an effective control of the rate of passage of different treatment components through the device, while securing a relatively broad operational pressure capability.

SUMMARY OF THE INVENTION

In general terms, the present invention provides an apparatus for continuous treatment of a mixture comprising a fluid component and a solid, particulate component, wherein said mixture is subjected to a filtering effect, said apparatus comprising, in combination: a vessel having inlet means for said mixture, discharge means for removing substantial portion of the solid particulate component from said housing; fluid permeable means disposed within said housing, spaced from inside wall means thereof and subdividing the interior of said housing into passage means for said mixture and into fluid receiving chamber means, said inlet means and said discharge means being inlet and discharge means of said passage means; fluid conducting means communicating with said chamber means for selective removal or feeding of fluid from or into said chamber means; and control means for governing the rate of discharge of said solid, particulate component from said vessel.

According to one feature of the present invention, the passage means is a plurality of separate passages extending from said inlet means to said discharge means and disposed in a parallel arrangement. The chamber means can also be a plurality of chambers disposed in a concurrent fashion relative to the direction of said passage means. Alternatively, the apparatus may comprise a plurality of said chambers separate from each other and disposed one after the other along the course of the passage means. Each chamber is preferably provided with separate respective fluid connecting means for withdrawal from or for feeding into the device a treatment fluid. The control of passage of the processed material through the device is preferably effected by throttling means adapted to selectively reduce cross-sectional area of the passage means at a selected one or more locations thereof.

Further features and advantages of the present invention will become apparent from the following description of some exemplary embodiments of the apparatus, with reference to the accompanying drawings showing different views of different embodiments in diagrammatic representations.

BRIEF DESCRIPTION OF THE DRAWINGS

FIG. 8 is a exemplary embodiment showing a plurality of liquid chambers and a single passage with flow control means included in the passage;

FIG. 10 is a partial sectional view of the embodiment of FIG. 3 showing, in a schematic way, exemplary arrangement of the supporting elements of the device;

FIG. 11 is section XI—XI of FIG. 10;

FIG. 12 is a partial section showing supporting elements of the upper part of the apparatus of FIG. 5; and FIG. 13 is section XIII—XIII of FIG. 12.

DETAILED DESCRIPTION OF EXEMPLARY EMBODIMENTS

Before proceeding with the description of different embodiments of the present invention, reference may be had generally to all of the drawings to see that all of the drawings show certain walls of the device as solid impermeable walls, while certain walls of the embodiments are shown as a wire mesh, it being understood that the representation of wire mesh is intended to merely indicate permeability of the wall, as the actual embodiment may be of any other suitable type of a fluid permeable wall. It will also be understood that due to a wide variety of application of the present invention, all of the simplified schematic drawings accompanying the present description are considered to be not to scale as the actual size and proportions of the device may vary to a greater or lesser degree depending on the particular application.

Figure 1:
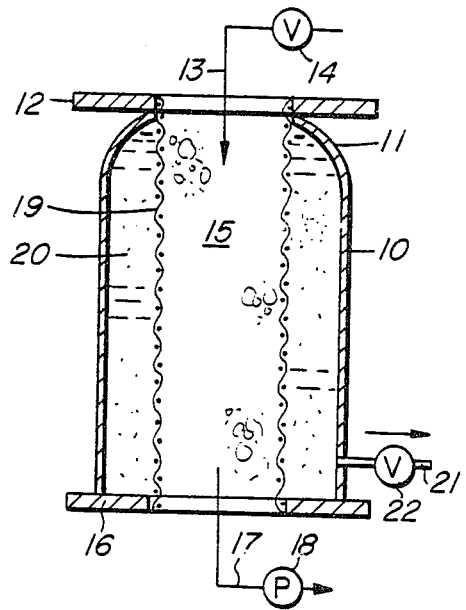
FIG. 1 is a simplified diagrammatic representation of a vertical section of one embodiment of the invention having a single passage and a single fluid chamber and disposed in an upright position.
Figure 2:
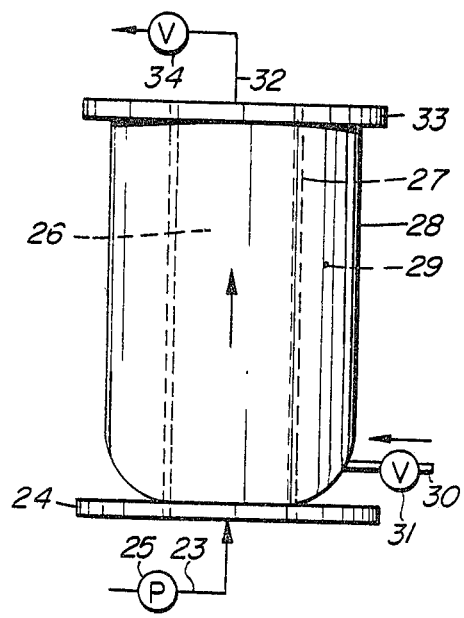
FIG. 2 is a view similar to that of FIG. 1 but showing the arrangement in an inverted position.

The basic form of the present invention can best be understood from the simplified embodiments of FIGS. 1 and 2 which differ from each other only in relatively insignificant details.

Turning firstly to FIG. 1, reference numeral 10 designates a tubular solid wall whose upper end, is convergent at 11. The top end of the convergent portion 11 merges with an annular flange 12 adapted for securement to a supply line 13 shown in diagrammatic fashion and including a control valve 14 for selectively controlling the rate of flow of mixture entering a passage 15 of the device. The bottom end of the device is provided with a flange 16 for securement to a discharge line 17 in which is included a pump 18 for advancement of the material discharged from the passage 15. The passage 15 is open on top and at bottom and is limited at sides by a permeable annular wall 19 subdividing the interior of the device into the aforesaid passage 15 and chamber 20. A fluid discharge line 21 provided with a selectively adjustable valve 22 serves the purpose of removing of filtrate from the chamber 20.

It will be appreciated from the above that the arrangement of FIG. 1 presents an embodiment of the present invention in which the pump 18 and the valve 14 cooperate to form control means determining the rate of advancement of the treated material through the passage 15. In the form shown in FIG. 1, the device is suitable, for instance, for plain separation of fluid (e.g. liquid) components from the advancing bed. In the shown embodiment, the bed proceeds vertically downwardly.

The advancement can also be reversed, as shown in the embodiment of FIG. 2 having the same basic components. In FIG. 2, 23 designates the feed line for the mixture and 24 is a flange for connecting the lower end of the apparatus to the line 23. The pump 25 serves the purpose of forcing the mixture to be treated into a passage 26 limited by permeable annular wall 27 inwardly spaced from the exterior solid wall 28 to define therebetween an annular chamber 29 which communicates via a conduit 30 including a valve 31 with a supply of treatment fluid which, in this case, is intended to enrich the matter of the advancing bed within the passage 26, or to extract certain fractions from the bed. A discharge line 32 secured to the upper flange 33 is provided with a valve 34. The valve 34 cooperates with the pump 25 and, to some degree, with the valve 31, to determine the rate of advancement of the particulate bed vertically upwardly through the passage 26.

The advantage of the embodiment of FIG. 1 is in that it utilizes, in addition to the pump 18 and the valve 14, natural gravity for advancement of the treated material through the passage 15. This may be of significance when abrasive wear of the permeable wall 19, may be of significance. On the other hand, the embodiment of FIG. 2 will be more suitable in applications wherein the abrasive wear is not significant, while a thorough treatment of particulate bed advancing through the passage 26 by a liquid supplied through the line 30 is desired. Those skilled in the art will readily appreciate that both of these embodiments can operate either continuously or in discontinuous fashion, depending on the respective actuation of the control elements such as pumps 18, 25 and valves 14, 34, respectfully. Those skilled in the art will also appreciate that supporting plates, ribs or the like for maintaining the appropriate spacing of permeable walls 19, 27 from the solid walls 10, 28, respectively are not shown for the sake of clarity.

Figure 3:
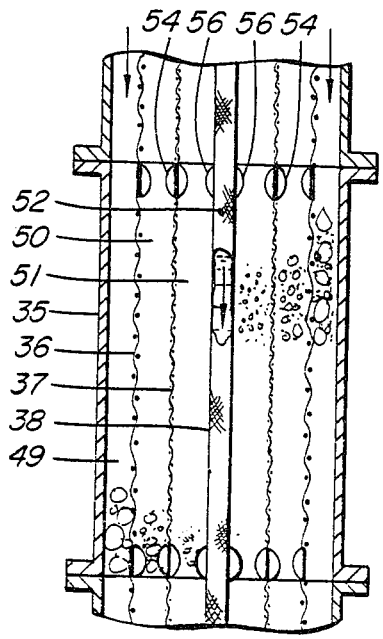
FIG. 3 is a partial sectional view of a further embodiment having a single fluid chamber but a plurality of passages for the filtering bed section.

Turning now to the embodiment of FIG. 3, the shown apparatus, again, has a solid outer tubular wall 35 and, disposed concentrically interiorly thereof, a first permeable wall 36, a second permeable wall 37 and a third permeable wall 38, in that order, proceeding toward the center of the tubular vessel 35. The coarseness of permeable walls 36, 37 and 38 decreases towards the center of the vessel 35. Accordingly, the wall 38 is a relatively fine mesh while the wall 36 presents a relatively coarse mesh. This embodiment differs in several aspects from the arrangements shown in FIGS. 1 and 2. First, the permeable tubular walls 36-38 are supported on respective axially spaced rings such as shown in partial sectional views of FIGS. 10 and 11. Thus, the coarse first permeable wall 36 extends between an upper ring 39 and a lower ring 40, the ring being fixedly secured by welding to the wall 35 by a series of radial ribs such as rib 41. A similar rib 42 secures fixedly the lower ring 40 to the wall 35. Another set of ribs 43, 44 holds rings 45, 46 of the intermediate mesh or second permeable wall 37. In the shown embodiment, the central or fine mesh third permeable wall 38 is fixed to a tubular member 47 held in place by radial ribs such as rib 48 connecting the tubular member 47 with the ring 45.

Thus, the respective rings and permeable walls cooperate to define therebetween an outermost annular passage 49, an annular chamber 50, a second annular chamber 51 and a central core section 52.

As best seen from FIG. 10, the rings 39, 45 and the outer surface of the tubular member 47 are provided with hollow, inflatable, annular rubber-like members 53, 54, 55 and 56, each of the members being operatively associated with a supply of compressed air (not shown) whereby the shape of each of the inflatable members 53-56 can be changed from a state in which the member is generally coincident with the respective surface of the ring, to an inflated state in which the members are as shown in FIG. 10, at which they serve the purpose of restricting the passage through the annular chambers 50, 51. A similar series of inflatable control members is shown at the bottom end of the apparatus of FIG. 3 to indicate that a selective control of passage of the material flowing through the device can be obtained.

The raw mixture of material to be treated is fed (by means not shown), into the outermost or exterior annular passage 49. Relatively coarse particles together with fine particles and with the liquid contained in the mixture pass through the first permeable wall 36 to eventually build-up a permeable bed within the chamber 50. Finer particles eventually pass through the permeable wall 37 to form within the chamber 51 a second, finer filtering bed. The fine mesh of the third permeable wall 38 allows passage of merely fluid or of extremely fine particles. The fluid thus separated from the mixture originally fed into the annular passage 49 can be discharged from the core section 52 in a known way.

It will be appreciated that the embodiment of FIG. 3 presents a refinement of the basic inventive idea in that there is control means within the apparatus (as opposed to the exterior pump and valve in FIGS. 1 and 2) by which the passage of different bed sections through the apparatus can be effectively controlled. No passage control means are shown within the annular passage 49 but it will be readily appreciated that such passage means can be provided for as well.

Figure 4:
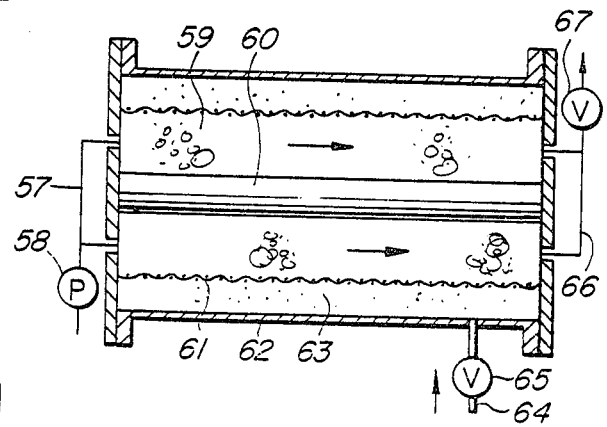
FIG. 4 is a partial horizontal section of another embodiment having a single passage, a single fluid chamber and a solid core centrally of the passage.

FIG. 4 shows another embodiment in which the mixture to be treated is delivered by a feed line 57 provided with a pump 58. The material to be processed passes through an annular passage 59 in a generally horizontal direct. The centre of the apparatus is provided with a solid tubular core section 60 forming an impermeable inner wall of the passage 59. The radially outward wall of the passage 59 is formed by a permeable wall or mesh 61 spaced inwardly from the exterior wall 62 of the apparatus. A primary fluid receiving chamber 63 is thus formed between the mesh 61 and wall 62, for receiving a treatment fluid coming through an inlet 64 provided with a control valve 65. At the discharge end, the mixture of the moving bed and of the primary fluid is conveyed to further processing by a discharge line 66 which may be provided with a control valve 67.

Figure 5:
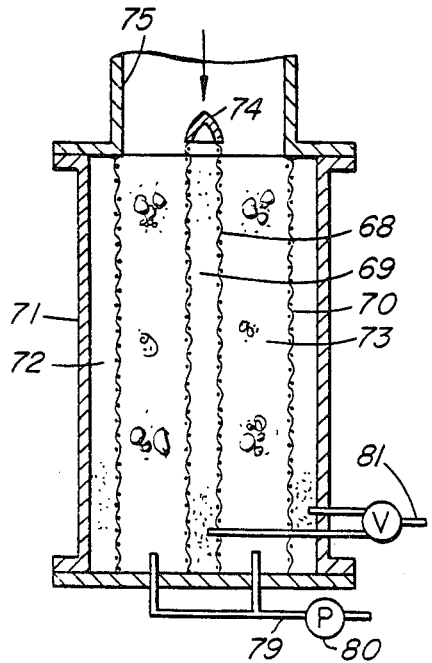
FIG. 5 is a modification of the embodiment of FIG. 4, having a single annular passage and two liquid chambers.

FIG. 5 shows a modification of the embodiment of FIG. 4, wherein the solid central core section 60 is replaced by a core section 68 whose wall is formed by a permeable mesh defining a chamber 69. Another mesh or permeable wall 70 is inwardly spaced from an exterior wall 71 to provide an annular chamber 72. The permeable wall 70 and the core section 68 combine to form an annular passage 73.

The top end of the chamber 69 is formed by a hollow impermeable cone 74 which facilitates the distribution or spreading of the treated mix coming through a feeding tube 75 which may be associated with usual feeding means such as a pump or a hopper, in generally the same fashion as the infeed elements 57, 58 referred to in connection with FIG. 4.

It will be appreciated on review of FIGS. 12 and 13, that the securement of the permeable walls defining the passage and the chambers of the embodiment of FIG. 5 is generally the same as mentioned above with reference to FIGS. 10 and 11. In particular, the top of the exterior wall 71 is integral with a flange 76 the upper surface of which is fixedly secured to the flanged lower end of the feeding tube 75. To the radially inward edge of the flange 76 is fixedly secured a plurality of flat, preferably hydrofoil shaped ribs 77 whose radially inward ends are, in turn, fixedly secured to the cone 74 to maintain same in place.

Those skilled in the art will thus readily appreciate that the actual physical arrangement of the integers of the above described embodiments will pose little difficulties in designing the particular arrangement. The bottom end of the arrangement of FIG. 2 would be generally of the same configuration the only exception, of course, being that the cone 74 would be replaced by a flat disc of the size corresponding to the base section 78 of the cone 74. The views of FIGS. 10, 11, 12 and 13 are, of course, simplified as they are merely intended to show that it requires ordinary skill to produce any of the devices shown and described herein.

Turning back to FIG. 5, the discharge of the moving bed passing through the passage 73 is again shown in a merely diagrammatic way, as taking place through a discharge line 79 provided with a pump 80. Reference numeral 81 designates, in a diagrammatic way, an outlet line for primary fluid accumulated in chambers 72 and 69 during the passage of the moving bed, it being understood that, if desired, the outlet line 81 may be substituted by an inlet line for treatment of the mixture by a suitable fluid, as the mixture proceeds through the passage 73.

Figure 6:
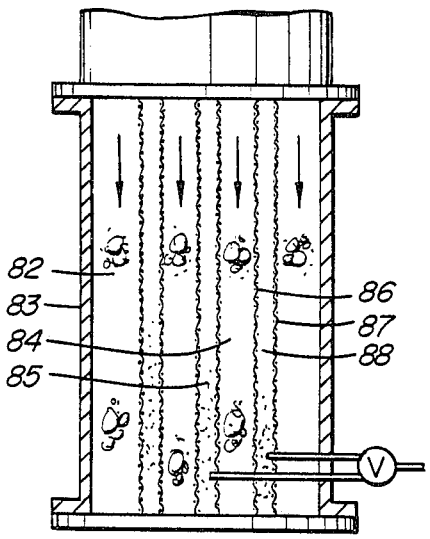
FIG. 6 is another modification having a plurality of passages and a plurality of fluid chambers.

FIG. 6 shows a modification of the arrangement of FIG. 5 with an equivalent of the cone 74 not shown.

The difference between the embodiment of FIG. 5 and FIG. 6 is merely in the number of passages. While FIG. 5 shows a single annular passage, FIG. 6 has two annular passages of which the exterior passage 82 is limited on the outside by the exterior wall 83 of the device, while the interior passage 84 is limited by a permeable wall surrounding an inside core chamber 85. A pair of permeable walls 86, 87 defines an annular chamber 88 for removal or feeding of the primary liquid from or into the matter advancing through the passages 82, 84. The usual feeding and discharge means are also provided even though not shiown in FIG. 6.

The embodiments described thus far refer to a primary fluid, the primary fluid being either a filtrate removed from the solid/fluid mixture passing through the apparatus or a fluid forced to penetrate the advancing bed of material.

Figure 7:
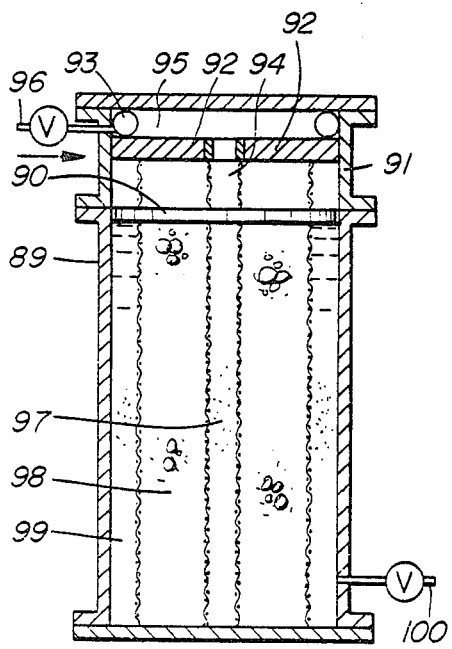
FIG. 7 is a yet another modification having a central liquid chamber for primary fluid and an extraction liquid chamber exteriorly of the bed.

FIG. 7 is a diagrammatic representation showing that the present invention is no less applicable to a treatment wherein it is desired to pass a primary fluid through a solid particulate bed of material and, withdrawing certain soluble components contained in the bed in the form of a secondary liquid, collecting the secondary liquid in a separate special chamber and removing same for further treatment or use. One of many examples of such type of treatment is purification of water wherein the untreated water is the equivalent of the "primary fluid" as referred to above, while the "secondary fluid" is purified water that passed through the sand bed of the device. The sand bed preferably moves through the passages but, as shown in the arrangement described with reference to FIGS. 10 and 11, means can be provided for throttling the passage for the particulate bed such as to make same stationary for all practical purposes. Reference numeral 89 in FIG. 7 designates the outer wall of the device. A flange 90 on top of the outer wall supports a spacer 91 to which is fixedly secured a set of radially supporting ribs 92, disposed in a fashion similar to the ribs 77 of FIG. 13. The top face of spacer 91 carries an annular header pipe 93 communicating with a central sleeve 94 via a plurality of radial connection pipes 95, each secured to the respective rib 92 to form a flush leading edge thereof from the standpoint of passage of the particulate bed through the device. Thus, the primary fluid supplied by the feed pipe 96 is distributed by the header 93 to the respective radial connection pipes 95 and then flows into the central sleeve 94 which in effect forms a top portion of a core chamber 97 of the device. The bed of particulate material flows downwardly through an annular passage 98 whose both sides are limited by permeable walls as described above. The outer permeable wall of the passage 98 is spaced from the outer wall 89 to define a chamber 99 provided with the usual outlet means 100. Thus, the treated fluid enters at 96, passes through the core chamber 97, through the advancing particulate bed in passage 98, into the "secondary fluid" collecting chamber 99 and is removed from same through the outlet means 100.

It would be an obvious modification of the arrangement of FIG. 7, to reverse the flow of fluid such that the "primary" fluid would enter at 100 and the "secondary" or treated fluid would be discharged at 96. Similarly the direction of advancement of the moving bed within the passage 98 can be effected in both directions or can be stopped at least temporarily by suitable throttling means as shown in FIGS. 10, 11.

FIG. 8 is a diagrammatic representation intended to merely show the operation of a still further modification of the apparatus according to the present invention with the obvious supporting parts referred to above omitted for the sake of clarity. It is shown in FIG. 8 that it is within the scope of the present invention to provide a single device performing the operation of several treatment devices such that different chambers for feeding or removal of the primary and/or secondary fluid are arranged generally in series. Reference numeral 101 designates an outer tubular wall provided at the upper inlet end thereof with a funnel shaped member 102 to which is fixedly secured by ribs or the like (not shown) a solid central core member 103 having a rounded tip. The funnel 102 is open at the bottom and fixedly secured at its downwardly turned face to an annular mesh 104 which is spaced from the outer wall 101 to define an annular chamber 105 communicating with the exterior of the device via a connection line 106. The bottom of the chamber 105 is formed by a ring 107 fixedly secured to the interior of the wall 101. The ring 107 is fixedly connected with a central, solid disc 108 by way of radial securement ribs not shown in the drawing. The top face of the disc 108 is secured around its periphery to a second annular mesh 109, the upper axial end of the mesh 109, in turn, being secured to the periphery of the solid end wall 110 of the core member 103. Around the side wall of the core member 103 and near the end wall 110 is fixedly secured an inflatable ring 111 made of a resilient rubber-like material and communicating with a source of compressed air, pressurized water or the like such that the exterior shape of the ring 111 can be selectively expanded or contracted to effectively reduce the cross-sectional area of the path of the annular passage 112 limited, at the interior, by the side wall of the core member 103 and by the mesh 109 and, exteriorly, by the mesh 104.

The end wall 110, the mesh 109 and the disc 108 form a core chamber 113 which communicates with the exterior of the apparatus through a line 114 provided with a valve.

Another throttling means of the type of inflatable rings 115, 116 is provided between the mutually facing edges of the disc 108 and ring 107. Proceeding downwards from the above described elements, it will be observed that a second group of chambers 113a and 105a, together with a subsequent passage section 112a is provided with a line 114a and with throttling arrangements 115a, 116a arranged as described above. The corresponding remaining elements of the second or intermediate portion of the device therefore have reference numerals corresponding to those used in the first section with an index "a".

The lowermost section of the device is similar to a substantial degree to the first two sections. The integers thereof are therefore referred to with the same reference numerals and indexed with "b". The lowermost part of the device forms a hollow tubular discharge chamber 117 which communicates, by means not shown in FIG. 8, with the usual discharge arrangement for the particulate bed. The particulate bed, of course, enters at the funnel 102 and is directed by the funnel 102 and by the solid core member 103 into the annular passage 112, 112a and 112b, respectively. During the passage through the device, liquid or gaseous components can be selectively removed from or delivered to the particulate bed as it advances vertically downwardly through the annular passages 112 down into the discharge chamber 117, from which the bed may be conveyed in the usual way either to further treatment or simply recirculated back to the inlet at the funnel 102.

As is apparent from the above description of previous embodiments, the arrangement of FIG. 8 allows a plurality of different treatments of the advancing bed of particulate material, both by way of removing liquid or gaseous fractions therefrom or by introducing liquid or gaseous fractions into the particulate mass.

Figure 9:
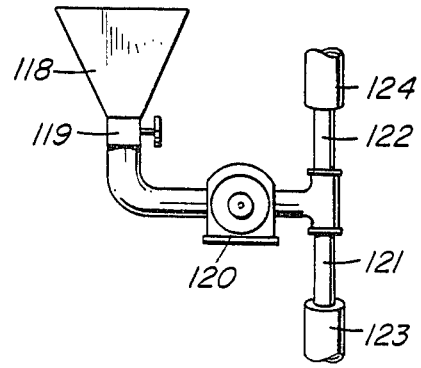
FIG. 9 (on the sheet of FIG. 5) is a diagram showing two devices, each generally corresponding in structure to FIG. 8, having common feeding and control means.

FIG. 9 is a diagrammatic, simplified representation intended to merely show that it is readily conceiveable within the scope of the present invention to utilize two or more separation devices of the present invention such that each of the devices operates in a slightly different way even though the physical arrangement of individual filtering units is (but need not necessarily be) the same. Reference numeral 118 designates a feeding hopper as a representation of feeding means. The hopper communicates via a valve 119 with a slurry pump 120 whose pressure end is branched by conduits 121 and 122 to deliver the processed mass to the inlets of suitable devices of the present invention, shown only in a diagrammatic way and referred to with reference numerals 123, 124, respectively. It will be appreciated that the advancement of the treated particulate material in the apparatus 123 will be enhanced by the force of gravity while the passage of the material through apparatus 124 will be somewhat retarded. Depending on the particular application, therefore, different properties of the discharged particulate material or of the retrieved primary or secondary liquid or fluid will thus be obtained from the two devices, which may be of advantage in certain applications of the apparatus of the present invention.

Those skilled in the art will appreciate from the above description of a variety of embodiments of the present invention that further modifications are readily conceiveable which may somewhat depart from the described embodiments without departing from the scope of the present invention as set forth in the accompanying claims.

I claim:

1. Apparatus for continuous treatment of a mixture comprising a fluid component and a solid particulate component, wherein a portion of the fluid component is to be separated from the particulate component by subjecting said mixture to a filtering effect, said apparatus comprising, in combination:
    (a) a generally tubular housing having an inlet end portion and an outlet end portion for inlet and discharge, respectively, of said mixture;
    (b) inner core means generally coaxial with and disposed centrally of said housing and defining within said housing a generally annular space axially aligned within said inlet and outlet end portions;
    (c) a fluid permeable first outer core means generally axial with said housing and subdividing said generally annular space into a generally annular passage adjacent to said inner core means, and an annular chamber disposed between said outer core means and said housing and remote from said inner core means;
    (d) said inner core means comprising a solid core portion generally impermeable by the fluid, and a permeable core portion defining a central chamber coextensive with and disposed downstream of said solid core portion, said solid core portion being disposed at said inlet end portion and including a convexly rounded tip section at an upstream end thereof;
    (e) first filtrate discharge means adapted to selectively communicate said central chamber with the exterior of said housing;
    (f) first partition means disposed at a downstream end of the central chamber and forming an end wall thereof, and second partition means disposed at a downstream end of said generally annular chamber;
    (g) inlet deflector means at the inlet end portion and arranged to direct an incoming flow of the mixture to be directed into said annular passage and towards the solid core portion; and
    (h) throttling means near said outlet end portion for controlling the speed of flow of said mixture through said annular passage by selectively controlling the cross-sectional area thereof at the outlet end portion.

2. Apparatus as claimed in claim 1, further including a first secondary processing means comprised of:
    (a) a second central chamber defined by a generally tubular permeable wall, by said first partition means and by a third partition means disposed at a downstream end of the second central chamber;
    (b) second outer core means generally coincident with but located downstream from said first outer core means and defining with said second partition means and a fourth partition means a second generally annular chamber;
    (c) second filtrate discharge means adapted to selectively communicate with second central chamber with the exterior of said housing for filtrate removal from said second central chamber; and
    (d) fluid inlet means for selectively communicating said second generally annular chamber with a source of a processing fluid.

3. Apparatus as claimed in claim 1 or 2, wherein at least a portion of said passage increases in the size of its cross-sectional area in the axial direction from said inlet end portion of said outlet end portion.

4. Apparatus as claimed in claim 2, further comprising a further secondary processing means of generally identical structural configuration as that of said first secondary processing means, said further secondary processing means adjoining said first secondary processing means at the downstream end thereof.

5. Apparatus as claimed in claim 2, comprising a plurality of said secondary processing means disposed axially one after the other in a direction toward said outlet portion.

6. Apparatus as claimed in claims 2, 4, or 5, wherein the partition means of the generally annular chamber and of the central chamber adjacent to the outlet end portion are each axially spaced from said outlet portion, whereby said generally annular inner passage merges with an outlet chamber whose cross-sectional configuration is defined generally solely by the wall of said housing.

7. Apparatus as claimed in claim 5, wherein said throttling means is disposed at a location adjacent to each of said partition, whereby a plurality of said throttling means is disposed within said annular space one after the other in the direction from said inlet end portion to said outlet end portion.

8. Apparatus as claimed in claim 1 or 7, wherein said throttling means includes at least two generally annular throttling sections coaxial with each other and with said housing and generally coincident with a common plane perpendicular to said axis, each throttling section being operable independent of the other, whereby a controlled rate of laminar flow can be effected within said annular space by selectively reducing cross-sectional area thereof at a selected generally annular section of the space.

9. Apparatus as claimed in claim 1, wherein the inlet end portion is a pressurized inlet operatively associated with feed pump means for feeding said mixture.

10. Apparatus as claimed in claim 1, wherein the housing is a generally upright housing.

11. Apparatus as claimed in claim 10, wherein said inlet end portion is a top end portion of said housing.

12. Apparatus as claimed in claim 9, wherein the housing is a generally upright housing and wherein inlet end portion is a bottom end portion of the container.

* * * * *